United States Patent
Houck

(10) Patent No.: US 11,002,305 B2
(45) Date of Patent: May 11, 2021

(54) FASTENER WITH CONTINUOUS DETENT REGION

(71) Applicant: Simpson Strong-Tie Company, Inc., Pleasanton, CA (US)

(72) Inventor: Joel Houck, Cedar Lake, IN (US)

(73) Assignee: SIMPSON STRONG-TIE COMPANY, INC., Pleasanton, CA (US)

(*) Notice: Subject to any disclaimer, the term of this patent is extended or adjusted under 35 U.S.C. 154(b) by 263 days.

(21) Appl. No.: 16/137,502

(22) Filed: Sep. 20, 2018

(65) Prior Publication Data

US 2020/0096035 A1 Mar. 26, 2020

(51) Int. Cl.
*F16B 25/00* (2006.01)

(52) U.S. Cl.
CPC ...... *F16B 25/0052* (2013.01); *F16B 25/0047* (2013.01); *F16B 25/00* (2013.01)

(58) Field of Classification Search
CPC .............. F16B 25/0047; F16B 25/0052; F16B 25/0057; F16B 25/0068; F16B 25/0084; F16B 25/103; F16B 33/02; F16B 35/041; F16B 25/00
USPC ...................... 411/386, 387.8, 411, 412, 424
See application file for complete search history.

(56) References Cited

U.S. PATENT DOCUMENTS

| | | | | |
|---|---|---|---|---|
| 3,426,642 A * | 2/1969 | Phipard, Jr. | ......... | F16B 25/0021 411/417 |
| 4,527,932 A * | 7/1985 | Onasch | ............... | F16B 25/0047 411/411 |
| 4,917,555 A | 4/1990 | Taubert | | |
| 5,544,993 A * | 8/1996 | Harle | ........................ | B23G 5/04 411/414 |
| 5,674,035 A * | 10/1997 | Hettich | ..................... | B23G 5/06 411/386 |
| 5,704,750 A | 1/1998 | Bartos et al. | | |
| 5,827,030 A * | 10/1998 | Dicke | ................. | F16B 25/0015 411/387.4 |
| 5,897,280 A * | 4/1999 | Dicke | ................. | F16B 25/0015 411/411 |
| 6,056,491 A * | 5/2000 | Hsu | ..................... | F16B 25/0015 411/311 |
| 6,332,741 B1 * | 12/2001 | Janusz | .................... | F16B 25/00 411/309 |

(Continued)

FOREIGN PATENT DOCUMENTS

| | | |
|---|---|---|
| EP | 0012441 A1 | 6/1980 |
| EP | 0623759 A1 | 9/1994 |
| WO | 2016048822 A1 | 3/2016 |

OTHER PUBLICATIONS

PCT/US2019/051248—International Search Report and Written Opinion dated Dec. 17, 2019, 18 pages.

(Continued)

*Primary Examiner* — Roberta S Delisle

(74) *Attorney, Agent, or Firm* — Vierra Magen Marcus LLP

(57) ABSTRACT

A fastener includes a shank having a first end and a second end. The fastener also includes a thread provided on the shank, the thread including a first region having a first thread angle and a second region with a second thread angle, at least a portion of the thread having said first thread angle. The fastener also includes an arcuate detent region in the shank between respective turns of the thread.

17 Claims, 2 Drawing Sheets

(56) References Cited

U.S. PATENT DOCUMENTS

| | | | | |
|---|---|---|---|---|
| 6,789,991 B2* | 9/2004 | Hsu | ............... | F16B 25/0031 |
| | | | | 411/311 |
| 7,156,600 B2* | 1/2007 | Panasik | ............... | B21H 3/02 |
| | | | | 411/308 |
| 7,798,756 B2* | 9/2010 | Chang | ............... | F16B 25/10 |
| | | | | 411/386 |
| 8,348,571 B2* | 1/2013 | Shih | ............... | F16B 25/103 |
| | | | | 411/386 |
| 2003/0031528 A1* | 2/2003 | Kram | ............... | F16B 25/0031 |
| | | | | 411/311 |
| 2005/0186047 A1 | 8/2005 | Sakamoto | | |
| 2007/0269287 A1 | 11/2007 | Runge et al. | | |
| 2011/0217145 A1* | 9/2011 | Kochheiser | ............... | F16B 25/106 |
| | | | | 411/412 |
| 2012/0155990 A1* | 6/2012 | Chao | ............... | F16B 25/0052 |
| | | | | 411/412 |
| 2012/0207564 A1* | 8/2012 | Kochheiser | ............... | F16B 25/0031 |
| | | | | 411/412 |
| 2012/0251268 A1* | 10/2012 | Yu | ............... | F16B 25/0015 |
| | | | | 411/393 |
| 2015/0052735 A1* | 2/2015 | Kochheiser | ............... | F16B 25/0084 |
| | | | | 29/525.11 |
| 2017/0254352 A1 | 9/2017 | Chen | | |

OTHER PUBLICATIONS

International Preliminary Report on Patentability dated Apr. 1, 2021 in International Application No. PCT/US2019/051248.

* cited by examiner

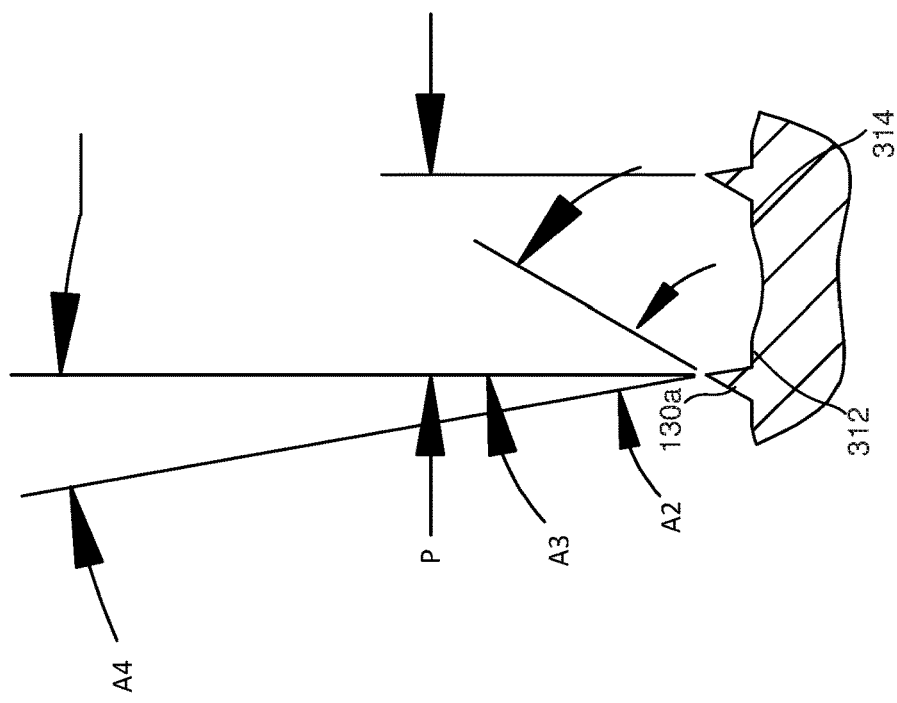
Detail B
FIG. 5
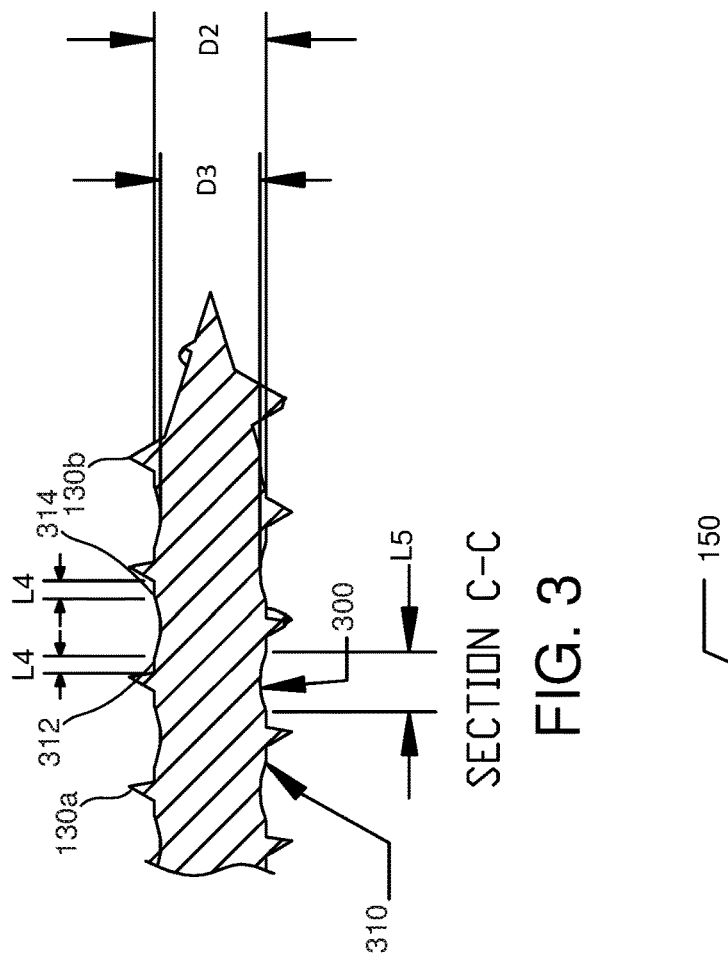
SECTION C-C
FIG. 3
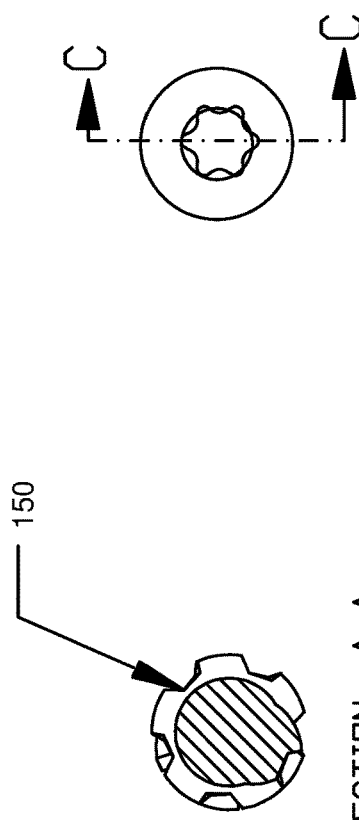
FIG. 2
SECTION A-A
FIG. 4

FASTENER WITH CONTINUOUS DETENT REGION

BACKGROUND

Fastener designs have been used to improve specific characteristics of fasteners in different materials. Ultimately, the fastener needs to bind one material to another securely and efficiently. Screw-type fasteners generally include a threaded shank with a tip at one end thereof and a head at the other end. The head is adapted to be driven by a tool to rotate the fastener. Some heads are designed to be recessed in a fastened material, while others are designed to clamp against the material so that the head protrudes above the surface of the bound material.

Particulate is generated when a fastener enters certain materials to be fastened. The particulate can impede the progress of the fastener in the material.

SUMMARY

Technology is described herein which provides a unique fastener. The fastener includes a shank having a first end and a second end defining a length. The fastener also includes a thread provided on the shank, the thread including a first region having a first thread angle and a second region with a second thread angle, at least a portion of the thread having said first thread angle. The fastener also includes an arcuate detent region in the shank between respective turns of the thread.

Implementations may include one or more of the following features. The fastener where the detent is separated from respective turns of the thread by a circular cross-section of the shank. The fastener where the detent is separated from the respective turns by the circular cross-section on a first side of the detent and a second side of the detent by flat separation regions. The fastener where the detent has a length which is at least two times greater than a length of a separation region. The fastener where the shank has a minor diameter and a lowest point of the arcuate detent has a lower minor diameter smaller than the minor diameter of the shank. The fastener where the minor diameter is greater than the lower minor diameter by a factor of 1.125. The fastener where a transition between the detent and the circular cross-section of the shank includes a rounded edge. The fastener where the arcuate detent region is defined by a radius of about 0.09 inch. The fastener where first region of the thread has a symmetrical cross-section and the second region has an asymmetrical cross section.

One general aspect includes a fastener, including: a shank having lead end at a first end and a head at a second end, and a surface with a minor diameter. The fastener also includes a continuous helical thread having a thread diameter greater than the minor diameter and positioned on the shank between the first end and the second end. The fastener also includes a continuous helical arcuate detent region positioned between turns of the helical thread, the detent having a lower minor diameter smaller than the minor diameter of the shank.

Implementations may include one or more of the following features. The fastener where the detent is separated from respective turns of the thread by flat separation regions of the surface of the shank. The fastener where the detent has a length which is at least two times greater than a length of a separation region. The fastener where a lowest point of the arcuate detent has the lower minor diameter. The fastener where the minor diameter is greater than the lower minor diameter by a factor of 1.125. The fastener where the arcuate detent region is defined by a radius of about 0.09 inch. The fastener where a transition between the detent and the circular cross-section of the shank includes a rounded edge. The fastener where the thread has a symmetric thread angle in a first region adjacent to the first end and an asymmetric thread angle in a second region, the first region thread having a first thread angle greater than a second thread angle of the second region, at least a portion of the contiguous helical thread including a serrated edge.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 depicts an end view of the fastener.

FIG. 3 partial sectional view along line C-C of FIG. 2.

FIG. 4 is a sectional view along line A-A of FIG. 1.

FIG. 5 is an enlarged, partial sectional view of Detail area B in FIG. 1

DETAILED DESCRIPTION

Figure 1:
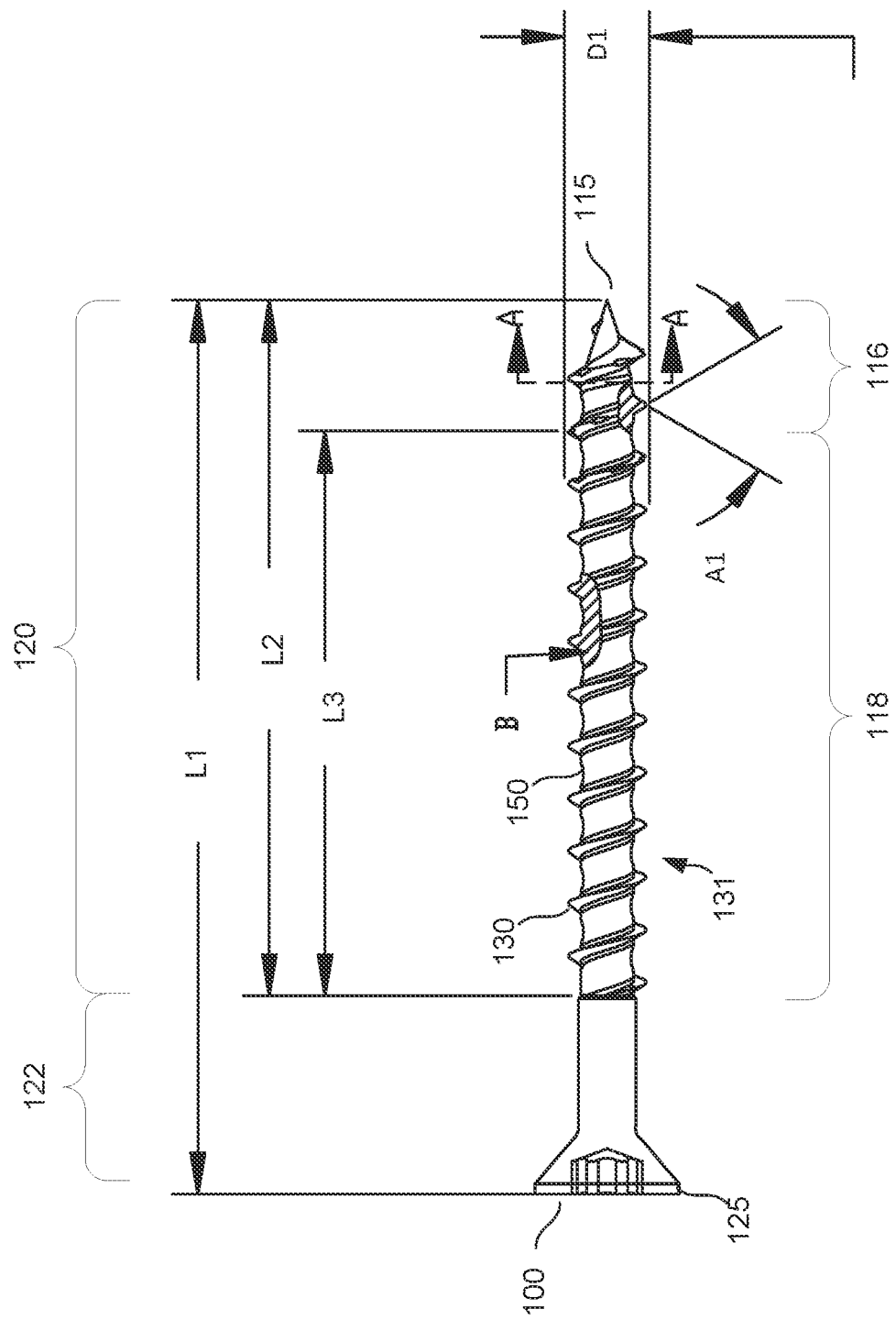
FIG. 1 depicts a plan view of a first embodiment of a fastener in accordance with the present technology, including a partial sectional view at Detail B, enlarged in FIG. 5.

The technology described herein is a fastener having features allowing securing elements in wood, composite or other material and providing improved performance.

The technology includes a threaded fastener 100 having a varied thread angle with a dust (or debris) channel (or detent) 300 in the shank 110 to remove particulate created when the fastener is inserted into a material. A first portion of the thread is formed with a first thread angle A1 and a second portion of the thread is formed with a second thread angle A2. In one embodiment, the first thread angle is greater than the second thread angle and is formed in the thread at the leading or first end of the fastener. Between turns of the thread, a dust channel or detent 150 is formed.

The technology is described with respect to FIGS. 1-5.

In one embodiment, the fastener 100 includes a shank 110 having a tip 115 at a leading or first end and a head 125 at a head end or second end. The shank 110 includes a threaded region 120 and a non-threaded region 122. A contiguous helical thread 130 is formed from the tip 115 toward the second end with a first, symmetric thread angle A1 beginning at the first end and extending toward the second end in a first thread region 116, and a second, asymmetric thread angle A2 contiguous with the first thread angle and extending from the first end toward the second end in a second thread region 118. The first thread angle A1 is greater than the second thread angle A2 and the thread (130b) with the asymmetric thread angle includes a serrated edge. In one embodiment, A1 is approximately 60 degrees and A2 is approximately 40 degrees (with A3 being approximately 30 degrees and A4 10 degrees (all within a variance of plus or minus 3-5 degrees).

The shank may be formed of galvanized steel, though other materials may be used. The first threaded section 116 extends from pointed tip 115 to second section 120. The second threaded section 118 extends from the first threaded section 116 to the non-threaded section 122. The shank in region 122 is cylindrical with a circular cross-section and in this embodiment comprises an unthreaded region.

The body of the shank has a minor diameter D2 (FIG. 3) in the threaded region 120. The second section 122 has a diameter which may be greater than or equal to D2.

The first threaded section 116 of the shank includes a first portion 130a of helical thread 130 formed on the shank 131 extending from the tip 104. The thread 130 has a diameter D1 which is approximately 1.4-1.75 times greater than D2. The thread 130 has an effective thread height (H) above the shank in the section 120 equivalent to ((D1−D2)/2) and a pitch P of approximately 17-18 times greater than the effective thread height.

In one embodiment, the thread 130 has a total length L2 and a second length L3 of asymmetric thread. Hence the length of region 116 is L2-L3, and L2 is approximately three times the length of region 116. The thread 130b includes a serrated edge defined by a plurality of teeth 150 illustrated in FIG. 2. Other serration formations may be used.

In a further unique aspect of the technology, the shank includes a dust removal detent 300 formed between turns of the thread 130. The detent 300 is a continuous helical structure formed in the shank and interleaved between and matching the turns of the thread 130. As illustrated in FIGS. 1 and 3, the detent 300 is positioned along the a portion of the length or the entire length of the shank in threaded section 120, between turns of the thread, and between both the symmetric thread angle portion of the thread 130a and asymmetric thread angle portion of the thread 130b. The detent is formed to have a concave and arcuate shape relative to the shank, with the arcuate shape defined by a radius R which in one embodiment is 0.090 inch (plus or minus 0.010 inch). The detent 300 as viewed in cross section in FIG. 3 has a length L5 and is separated from turns of the thread 130 by separation regions 312, 314 having a length L4 of the surface of the shank. The separation regions 312, 314 are positioned at the minor diameter D2 and comprise flat (as viewed in FIGS. 1, 3 and 5) portions of the surface of the shank between the thread turns. In one embodiment, L5 is approximately two times greater than L4. The separation regions 312, 314 make a smooth transition 310 between such regions and the detent 300 (such as by means of a rounded edge).

The detent has a depth defined by the difference between minor diameter D2 and a lower minor diameter D3. In one embodiment, the ratio of D2:D3 is 1.125.

In various embodiments, the total length L1 of the fastener may vary between 2.75-4 inches, and length L2 may be 1.75 inches. In such embodiment the minor diameter D2 may be 0.135 inch and the lower minor diameter 0.120 inch, such that the depth of each detent is 0.00075 inch.

Head 125 may be any standard head adapted to receive a tool which can provide torque to the fastener, but in the embodiment of FIGS. 1-5, a hex nut head is used.

The detent dust channel holds debris created when drilling a hole in concrete or masonry in addition to debris that is created while installing the fastener. Through experimentation, it has been determined that the smooth, arcuate shape of the detent regions significantly improves particulate holding when inserting the fastener into materials such as concrete and masonry. Improvements are also seen when fastening wood and composite. The arcuate nature of the detent allows particulate a position within which to rest while the fastener is inserted into the material to be fastened, thereby not impeding progress of the fastener. In one embodiment, the dust channel provides about a 15% reduction in installation effort over a similar screw created without the dust channel.

Embodiments of the technology include a fastener, comprising a shank having a first end and a second end defining a length; a thread provided on the shank, the thread including a first region having a first thread angle and a second region with a second thread angle, at least a portion of the thread having said first thread angle; and an arcuate detent region in the shank between respective turns of the thread.

The fastener may include the foregoing fastener wherein the detent is separated from respective turns of the thread by a circular cross-section of the shank.

The fastener may include any of the above described fasteners wherein the detent is separated from the respective turns by the circular cross-section on a first side of the detent and a second side of the detent by flat separation regions.

The fastener may include any of the above described fasteners wherein the detent has a length which is at least two times greater than a length of a separation region.

The fastener may include any of the above described fasteners wherein the shank has a minor diameter and a lowest point of the arcuate detent has a lower minor diameter smaller than the minor diameter of the shank.

The fastener may include any of the above described fasteners wherein the minor diameter is greater than the lower minor diameter by a factor of 1.125.

The fastener may include any of the above described fasteners wherein the arcuate detent region is defined by a radius of about 0.09 inch.

The fastener may include any of the above described fasteners wherein a transition between the detent and the circular cross-section of the shank includes a rounded edge.

The fastener may include any of the above described fasteners wherein first region of the thread has a symmetrical cross-section and the second region has an asymmetrical cross section.

Another embodiment includes a fastener, comprising a shank having lead end at a first end and a head at a second end, and a surface with a minor diameter; a continuous helical thread having a thread diameter greater than the minor diameter and positioned on the shank between the first end and the second end; and a continuous helical arcuate detent region positioned between turns of the helical thread, the detent having a lower minor diameter smaller than the minor diameter of the shank.

The fastener may include any of the above described fasteners wherein the detent is separated from respective turns of the thread by flat separation regions of the surface of the shank.

The fastener may include any of the above described fasteners wherein the detent has a length which is at least two times greater than a length of a separation region.

The fastener may include any of the above described fasteners wherein a lowest point of the arcuate detent has the lower minor diameter.

The fastener may include any of the above described fasteners wherein the minor diameter is greater than the lower minor diameter by a factor of 1.125.

The fastener may include any of the above described fasteners wherein the arcuate detent region is defined by a radius of about 0.09 inch.

The fastener may include any of the above described fasteners wherein a transition between the detent and the circular cross-section of the shank includes a rounded edge.

The fastener may include any of the above described fasteners wherein the thread has a symmetric thread angle in a first region adjacent to the first end and an asymmetric thread angle in a second region, the first region thread having a first thread angle greater than a second thread angle of the second region, at least a portion of the contiguous helical thread including a serrated edge.

A fastening means may include a shank, and means 300 for removing particulate as the fastener enters a material to be fastened. The means 300 may include a detent interleaved with a helical thread on the shank of the fastener.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fastener, comprising:
a shank having a first end and a second end defining a length; and
a thread provided on the shank, the thread including a first region having a first thread angle and a second region with a second thread angle, at least a portion of the thread having said first thread angle;
an arcuate detent region in the shank between respective turns of the thread, the turns of the thread defining a pitch, the arcuate detent region centered between the respective turns.

2. The fastener of claim 1 wherein the detent is separated from respective turns of the thread by a circular cross-section of the shank.

3. The fastener of claim 1 wherein the detent is separated from the respective turns by the circular cross-section on a first side of the detent and a second side of the detent by flat separation regions.

4. The fastener of claim 3 wherein the detent has a length which is at least two times greater than a length of a separation region.

5. The fastener of claim 1 wherein the shank has a minor diameter, and a lowest point of the arcuate detent has a lower minor diameter smaller than the minor diameter of the shank.

6. The fastener of claim 5 wherein the minor diameter is greater than the lower minor diameter by a factor of 1.125.

7. The fastener of claim 6 wherein a transition between the detent and the circular cross-section of the shank includes a rounded edge.

8. The fastener of claim 5 wherein the arcuate detent region is defined by a radius of about 0.09 inch.

9. The fastener of claim 1 wherein first region of the thread has a symmetrical cross-section and the second region has an asymmetrical cross section.

10. A fastener, comprising:
a shank having lead end at a first end and a head at a second end, and a surface with a minor diameter;
a continuous helical thread having a thread diameter greater than the minor diameter and positioned on the shank between the first end and the second end; and
a continuous helical arcuate detent region positioned between turns of the helical thread, the detent having a lower minor diameter smaller than the minor diameter of the shank, the turns of the thread defining a pitch, the arcuate detent region centered between the respective turns.

11. The fastener of claim 10 wherein the detent is separated from respective turns of the thread by flat separation regions of the surface of the shank.

12. The fastener of claim 11 wherein the detent has a length which is at least two times greater than a length of a separation region.

13. The fastener of claim 11 wherein a lowest point of the arcuate detent has the lower minor diameter.

14. The fastener of claim 13 wherein the minor diameter is greater than the lower minor diameter by a factor of 1.125.

15. The fastener of claim 14 wherein the arcuate detent region is defined by a radius of about 0.09 inch.

16. The fastener of claim 15 wherein a transition between the detent and the circular cross-section of the shank includes a rounded edge.

17. The fastener of claim 11 wherein the thread has a symmetric thread angle in a first region adjacent to the first end and an asymmetric thread angle in a second region, the first region thread having a first thread angle greater than a second thread angle of the second region, at least a portion of the contiguous helical thread including a serrated edge.

* * * * *